United States Patent
Violette et al.

(10) Patent No.: US 12,214,901 B2
(45) Date of Patent: Feb. 4, 2025

(54) PROTECTIVE TARPAULIN FOR AN AIRCRAFT PROPULSION ENGINE

(71) Applicant: Airbus Operations SAS, Toulouse (FR)

(72) Inventors: Luc Violette, Toulouse (FR); Xavier Kern, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 231 days.

(21) Appl. No.: 17/902,213

(22) Filed: Sep. 2, 2022

(65) Prior Publication Data
US 2023/0079530 A1 Mar. 16, 2023

(30) Foreign Application Priority Data
Sep. 10, 2021 (FR) .................................... 2109500

(51) Int. Cl.
*B64F 1/00* (2024.01)
*C08F 14/26* (2006.01)

(52) U.S. Cl.
CPC .............. *B64F 1/005* (2013.01); *C08F 14/26* (2013.01)

(58) Field of Classification Search
CPC .................. B64F 1/005; C08F 14/26
USPC ......................................................... 150/157
See application file for complete search history.

(56) References Cited

U.S. PATENT DOCUMENTS

| 3,646,980 | A * | 3/1972 | Peterson ................. B64F 1/005 244/129.4 |
| 6,871,819 | B2 * | 3/2005 | Garric ....................... F02C 7/04 244/121 |
| 8,651,415 | B1 | 2/2014 | Sparks |
| 11,772,812 | B1 * | 10/2023 | Caban, II ................ B64F 1/005 150/157 |
| 2004/0035730 | A1 * | 2/2004 | Bickerstaff ............... B32B 5/08 53/139.5 |
| 2013/0294002 | A1 | 11/2013 | Thompson et al. |
| 2013/0330524 | A1 | 12/2013 | King et al. |
| 2015/0089879 | A1 * | 4/2015 | Sparks ................... B64F 1/005 49/460 |

FOREIGN PATENT DOCUMENTS

| CN | 204212506 U | 3/2015 |
| DE | 202008013734 U1 | 2/2009 |
| DE | 202012100112 U1 | 2/2012 |
| WO | 9810930 A1 | 3/1998 |

OTHER PUBLICATIONS

French Search Report; priority document.

* cited by examiner

*Primary Examiner* — Sue A Weaver
(74) *Attorney, Agent, or Firm* — Greer, Burns & Crain, Ltd.

(57) ABSTRACT

A protective tarpaulin for a propulsion engine of an aircraft is made of a material having an air permeability index that is sufficiently high to prevent the accumulation of moisture inside the engine or a nacelle surrounding the engine.

5 Claims, 2 Drawing Sheets

PROTECTIVE TARPAULIN FOR AN AIRCRAFT PROPULSION ENGINE

CROSS-REFERENCES TO RELATED APPLICATIONS

This application claims the benefit of the French patent application No. 2109500 filed on Sep. 10, 2021, the entire disclosures of which are incorporated herein by way of reference.

FIELD OF THE INVENTION

The invention relates to the field of the protection of propulsion engines of aircraft.

BACKGROUND OF THE INVENTION

When an aircraft is parked on the ground, especially if the time spent parked exceeds a few days, it is customary to protect an air inlet and sometimes an air outlet of the engine by means of a protective tarpaulin. This tarpaulin is generally fitted on a nacelle surrounding the engine, more particularly at an air inlet lip of the nacelle. The aim of placing such a tarpaulin is notably to protect the engine and the nacelle from sand, rain, strong wind and intrusions by insects or birds. Such a tarpaulin is generally made of a material corresponding to a plastics material or to a fabric impregnated with plastic, so as to be sealed with respect to water and air.

However, it has been observed that when an aircraft is parked for a prolonged period, for example for a period of several weeks or several months, such a tarpaulin promotes the accumulation of moisture inside the engine and the nacelle, in particular on the lip of the air inlet of the nacelle. In order to avoid any risk of corrosion, it would be desirable to find a solution to this problem of moisture accumulation.

SUMMARY OF THE INVENTION

The present invention aims, in particular, to provide a solution to this problem. It relates to a protective tarpaulin for a propulsion engine of an aircraft. This tarpaulin is noteworthy in that it is made of a material having an air permeability index that is sufficiently high to prevent the accumulation of moisture inside the engine or a nacelle surrounding the engine.

Thus, the material of the tarpaulin is what is known as a "breathable" material, thus making it possible to avoid the accumulation of moisture inside the engine and the nacelle.

According to various embodiments, which can be taken in isolation or in combination:
- the material corresponds to a net with a mesh less than or equal to 2 mm. In a particular manner, the mesh of the net is less than or equal to 1 mm;
- the material is of the stretched PTFE type;
- the tarpaulin comprises a first part, the material of which is of the stretched PTFE type, and a second part, the material of which corresponds to a net with a mesh less than or equal to 2 mm. In a particular manner, the first part corresponds to an external part of the tarpaulin, provided so as to be at least partially disposed on a nacelle surrounding the engine, and the second part is an internal part of the tarpaulin, at least partially surrounded by the first part;
- the tarpaulin is provided for being fitted at an air inlet of a nacelle of an aircraft engine;
- the tarpaulin is provided for being fitted at an air outlet of an engine assembly plus nacelle of an aircraft.

BRIEF DESCRIPTION OF THE DRAWINGS

The invention will be better understood upon reading the following description and upon studying the appended figures.

DETAILED DESCRIPTION OF THE PREFERRED EMBODIMENTS

Figure 1:
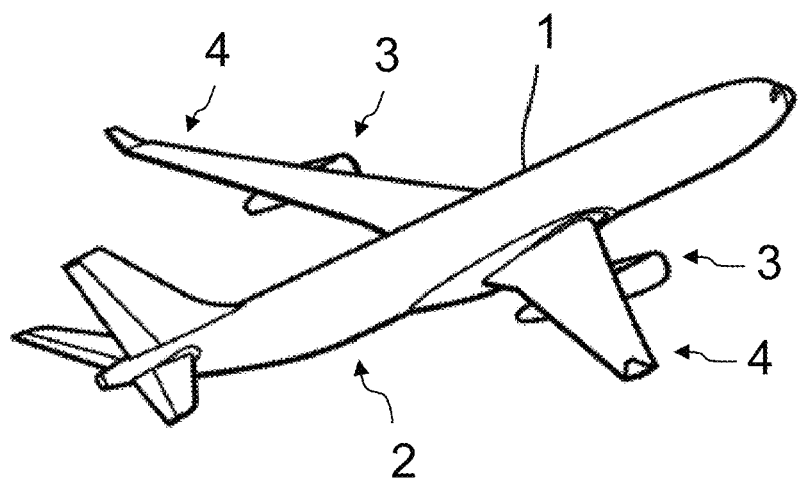
FIG. 1 is a simplified perspective view of an aircraft.
Figure 2:
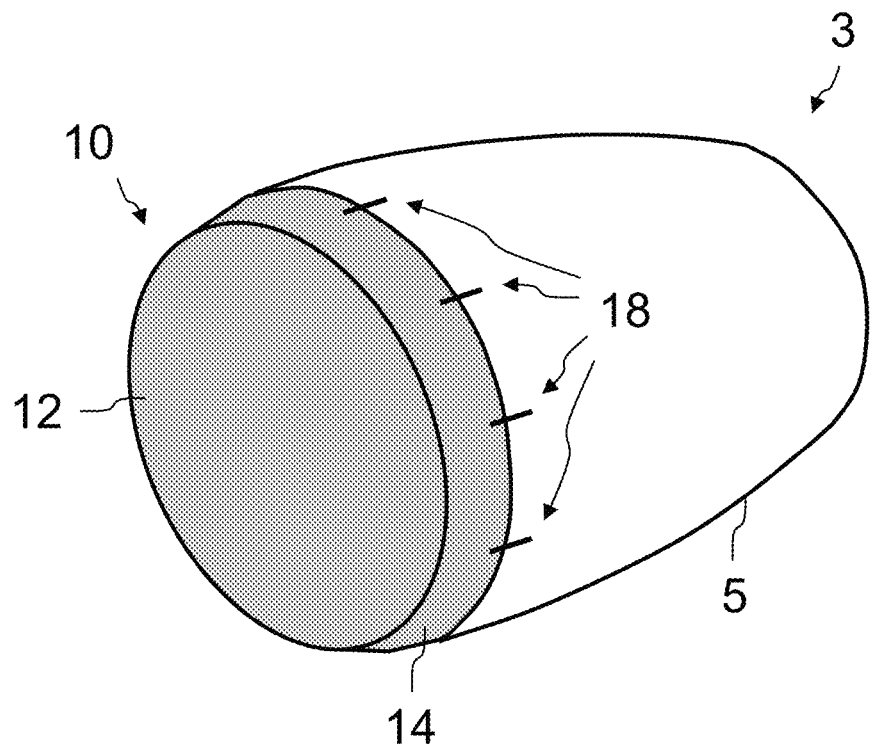
FIG. 2 schematically illustrates a protective tarpaulin for an aircraft propulsion engine, according to one embodiment of the invention.

The aircraft 1 shown in FIG. 1 comprises wings 4 which are secured to a fuselage 2. It also comprises propulsion engines 3 which are attached to the wings 4. An engine 3 is surrounded by a nacelle 5 as illustrated in FIG. 2. When the aircraft 1 is parked on the ground, it can be equipped with a protective tarpaulin 10 for a propulsion engine 3. The tarpaulin 10 is disposed on an upstream part of the nacelle, the notion of upstream being considered with respect to the direction of circulation of the air in the engine during operation thereof. The tarpaulin 10 comprises a face 12 provided for closing off an air inlet of the nacelle, and also an edge 14 provided for attaching the tarpaulin 10 to the nacelle 5, for example by means of fasteners 18.

In a first embodiment, the tarpaulin 10 is made of a material corresponding to stretched PTFE (acronym for polytetrafluoroethylene). This material has the property of being "breathable", that is to say, of allowing moisture present in the engine or in the nacelle to be discharged, due to a sufficiently high air permeability index of the material. Such a material is sold, for example, under the name Gore® or Gore Tex®. This material allows the tarpaulin to fulfil its customary functions, that is to say, of protecting the engine and the nacelle against the ingress of dust, sand, rain, insects, birds, etc. In addition, since the material is breathable, it has the advantage of preventing the accumulation of moisture inside the engine and the nacelle. This material is also pliable and can be easily stretched, and this has the advantage of allowing the edge 14 of the tarpaulin to be readily stretched and pressed against the nacelle 5 when the tarpaulin is fitted on the nacelle.

In a second embodiment, the tarpaulin 10 is made of a material corresponding to a net with a fine mesh, for example less than or equal to 2 mm. In a particular manner, the mesh of the net is less than or equal to 1 mm. This material also allows the tarpaulin to fulfil its customary functions insofar as the mesh of the net is sufficiently fine. In addition, it is breathable since the air is able to pass through the meshes of the net. This makes it possible to prevent the accumulation of moisture inside the engine and the nacelle.

Figure 3:
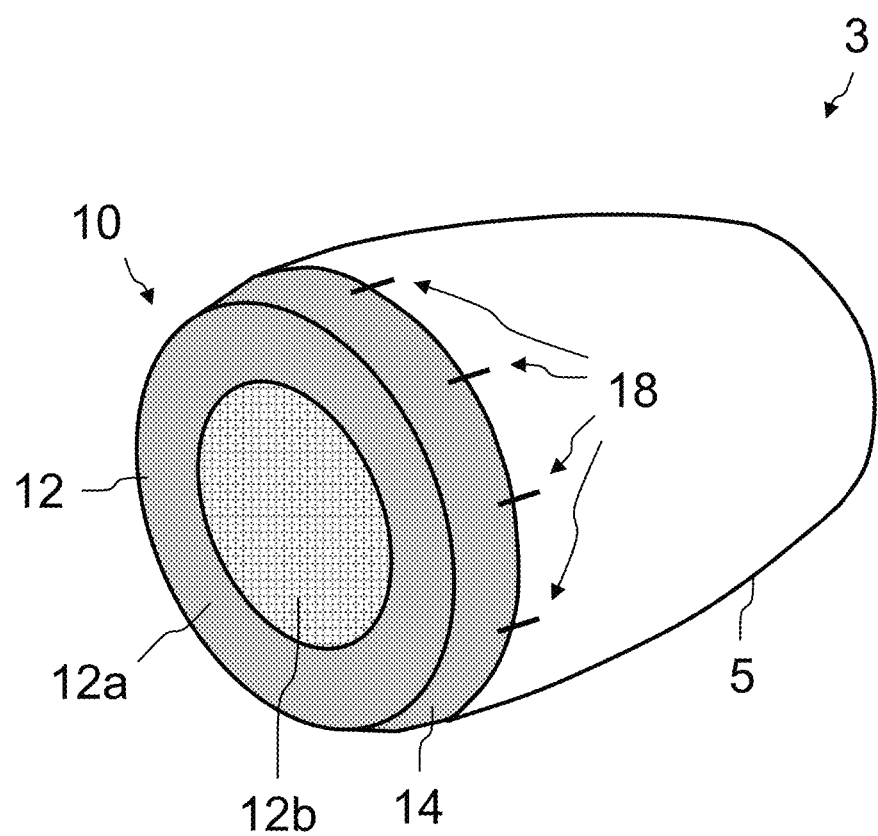
FIG. 3 schematically illustrates a protective tarpaulin for an aircraft propulsion engine, according to another embodiment of the invention.

In a third embodiment, as shown in FIG. 3, the tarpaulin 10 comprises a first part 12a, 14, the material of which is of the stretched PTFE type, and a second part 12b, the material of which corresponds to a net with a fine mesh. The dimensions of the mesh of the net are, for example, similar to those of the net of the second embodiment. The two parts of the tarpaulin are assembled with one another by stitching or by welding, for example. The first part 12a, 14 corresponds to an external part of the tarpaulin, provided so as to be at least partially disposed on the nacelle 5, and the second part 12b is an internal part of the tarpaulin, at least partially surrounded by the first part 12a. Thus, the second part 12b, the material of which corresponds to a net, is situated in a central part of the face 12 of the tarpaulin. This embodiment benefits from the advantage of the first embodiment which allows the edge 14 of the tarpaulin to be readily stretched and pressed against the nacelle 5 when the tarpaulin is fitted on the nacelle. This furthermore makes it possible to select a net for the material of the second part 12b, being able to be more breathable than the stretched PTFE-type material of the first part, so as to increase the breathable nature of the tarpaulin 10 and thus improve the discharge of the humidity in the engine and the nacelle.

Although various embodiments have been described for a tarpaulin for an air inlet of the engine assembly 3 plus nacelle 5, this is not limiting of the invention which also applies to a tarpaulin provided so as to be disposed on an air outlet of the engine assembly plus nacelle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A protective tarpaulin for a propulsion engine of an aircraft, said tarpaulin being made of a material having an air permeability index that is sufficiently high to prevent an accumulation of moisture inside the engine or a nacelle surrounding the engine, the tarpaulin comprising:
    a first part, the first part produced from a stretched PTFE type material; and
    a second part, the second part produced from a breathable net material,
    wherein the first part corresponds to an external part of the tarpaulin, provided to be at least partially disposed on a nacelle surrounding the engine, and the second part is an internal part of the tarpaulin, at least partially surrounded by the first part, the second part configured to align with an opening in the nacelle of the propulsion engine.

2. The tarpaulin according to claim 1, wherein the material of the second part corresponds to a net with a mesh less than or equal to 2 mm.

3. The tarpaulin according to claim 1, wherein the mesh of the net is less than or equal to 1 mm.

4. The tarpaulin according to claim 1, wherein the tarpaulin is configured to be fitted at an air inlet of a nacelle of an aircraft engine.

5. The tarpaulin according to claim 1, wherein the tarpaulin is configured to be an air outlet of an engine assembly plus nacelle of an aircraft.

* * * * *